United States Patent [19]
Marantz et al.

[11] Patent Number: 5,808,270
[45] Date of Patent: Sep. 15, 1998

[54] PLASMA TRANSFERRED WIRE ARC THERMAL SPRAY APPARATUS AND METHOD

[75] Inventors: Daniel R. Marantz, Sands Point; Keith A. Kowalsky, East Norwich, both of N.Y.; James R. Baughman, Plymouth; David J. Cook, Farmington Hills, both of Mich.

[73] Assignee: Ford Global Technologies, Inc., Dearborn, Mich.

[21] Appl. No.: 799,242

[22] Filed: Feb. 14, 1997

[51] Int. Cl.[6] ..................................................... B23K 10/00
[52] U.S. Cl. .................................. 219/121.47; 219/76.16; 219/121.59; 219/121.54; 219/121.53; 427/449; 427/576
[58] Field of Search ......................... 219/121.59, 121.47, 219/121.53, 76.14, 76.15, 76.16; 427/449, 569, 576

[56] References Cited

U.S. PATENT DOCUMENTS

| | | |
|---|---|---|
| 2,982,845 | 5/1961 | Yenni et al. . |
| 3,472,995 | 10/1969 | Browning et al. . |
| 4,370,538 | 1/1983 | Browning ............................ 219/121.59 |
| 4,681,258 | 7/1987 | Jenkins et al. . |
| 4,788,402 | 11/1988 | Browning . |
| 5,080,056 | 1/1992 | Kramer et al. . |
| 5,245,153 | 9/1993 | Singer et al. . |
| 5,296,667 | 3/1994 | Marantz et al. . |
| 5,334,235 | 8/1994 | Dorfman et al. . |
| 5,364,663 | 11/1994 | McCune, Jr. et al. . |
| 5,442,153 | 8/1995 | Marantz et al. . |

Primary Examiner—Mark H. Paschall

[57] ABSTRACT

A plasma transferred wire arc thermal spray apparatus and method producing an extended-arc and supersonic plasma jet stream for applying a dense metallic coating on a substrate, such as a concave internal surface of a bore. The apparatus includes a plasma generating torch assembling having a cathode and an anode nozzle surrounding the cathode and a wire feeder which continuously feeds the tip of a wire feedstock opposite a constricted nozzle orifice and wherein the wire feedstock is maintained at the same positive electrical potential as the nozzle. Plasma gas is directed into the nozzle, preferably generating a vortex flow around the cathode and exiting the restricted nozzle orifice. The improved apparatus includes a pilot power supply and a high voltage or high frequency power supply which initiates the electric arc and the constricted plasma arc and a separate main power supply which extends the constricted plasma arc to the wire tip. In the disclosed bore coating apparatus and method, the plasma torch assembly is rotated about the longitudinal axis of the wire feedstock while maintaining the electrical connection between the wire feedstock and the nozzle. The apparatus further includes an annular conical port surrounding the restricted nozzle orifice connected to a second gas source which generates an annular conical gas stream surrounding the wire tip having a point of intersection spaced downstream of the wire tip and the second gas is further directed to the wire feed guide to cool the assembly.

24 Claims, 4 Drawing Sheets

PLASMA TRANSFERRED WIRE ARC THERMAL SPRAY APPARATUS AND METHOD

TECHNICAL FIELD

This invention relates generally to a thermal spray apparatus and method of thermally spraying materials and, in particular, to a plasma transferred wire arc thermal spray apparatus and method which utilizes a high velocity transferred constricted plasma arc to produce extremely dense materials as coatings and free-standing near-net-shapes as well as a constricted plasma transferred wire arc thermal spray bore coating apparatus and method which produces high density materials formed by thermal spraying and which have superior metallurgical and physical characteristics.

BACKGROUND

The plasma transferred wire arc thermal spray process melts a feedstock material, usually in the form of a metal wire or rod, by using a constricted plasma arc to melt the tip of the wire or rod, removing the molten material with a high-velocity jet of ionized gas issuing from a constricting orifice. The ionized gas is a plasma and hence the name of the process. Plasma arcs operate typically at temperatures of 18,000°–25,000° F.(10,000°–14,000° C.). An arc plasma is a gas which has been heated by an electric arc to at least a partially ionized condition, enabling it to conduct an electric current. A plasma exists in any electric arc but the term plasma arc is associated with plasma generators which utilize a constricted arc. One of the features which distinguishes plasma arc devices from other types of arc generators is that, for a given electrical current and gas flow rate, the arc voltage is significantly higher in the constricted arc device. In addition, a constricted arc device is one which causes all of the gas flow with its added energy to be directed through the constricted orifice resulting in very high exiting gas velocities, generally in the supersonic range. There are two modes of operation of constricted plasma torches. One of these modes, known as the "non-transferred" mode. Characteristically, the non-transferred plasma torch has a cathode and an anode in the form of a nozzle. In general, practical considerations make it desirable to keep the plasma arc within the nozzle with the arc terminating on the inner nozzle wall. However, under certain operating conditions, it is possible to cause the arc to extend outside the nozzle bore and then fold back, establishing a terminal point for the arc on the outside face of the anode constricting nozzle. The other mode of plasma operation is termed "transferred-arc" mode. In this mode of plasma operation, the plasma arc column extends from the cathode through a constricting nozzle and then leaves the torch and is terminated on a workpiece anode which is located electrically spaced and isolated from the plasma torch assembly.

In the plasma transferred wire arc thermal spray process, the plasma arc is constricted by passing it through an orifice downstream of the cathode electrode. As plasma gas passes through the arc, it is heated to a very high temperature, expands and is accelerated as it passes through the constricting orifice often achieving supersonic velocity on exiting the orifice, towards the tip of the wire feedstock. Typically, the different plasma gases used for the plasma transferred wire arc thermal spray process are air, nitrogen or a admixture of argon and hydrogen. The intensity and velocity of the plasma is determined by several variables including the type of gas, its pressure, the flow pattern, the electric current, the size and shape of the orifice and the distance from the cathode to the wire feedstock.

Figure 1:
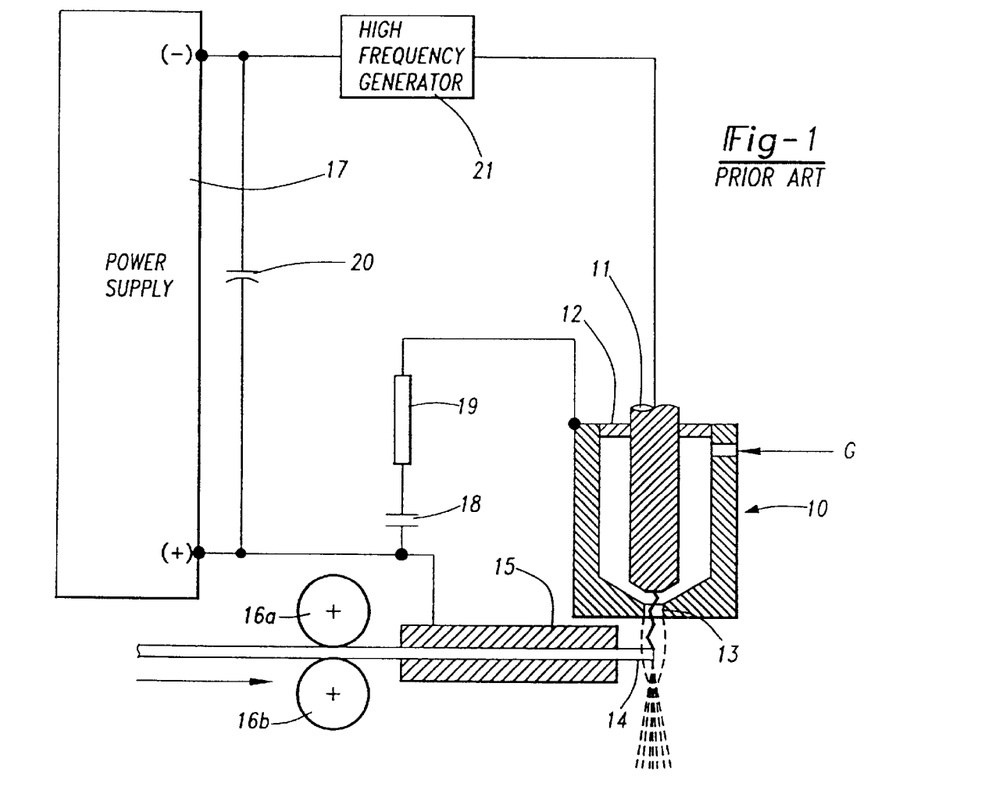
FIG. 1 is a schematic representation of a prior art plasma transferred wire arc configuration.

The prior art plasma transferred wire arc process shown in FIG. 1 is a schematic representation of the apparatus disclosed in our U.S. Pat. No. 5,296,667. The process operates on direct current from a constant current type power supply 17. The cathode electrode 11 is connected to the negative terminal of the power supply 17 through a high frequency generator 21 which is employed to initiate an electrical arc between the cathode 11 and the constricting nozzle 10. The high frequency arc initiating circuit is completed by the momentary closure of the pilot-arc relay contact 18 allowing direct current to flow from the positive terminal of power supply 17 through pilot resistor 19 to the constricting nozzle 10, through the high frequency arc formed between the cathode 11 and the constricting nozzle 10, through the high frequency generator 21 to the negative terminal of the power supply 17. The high frequency circuit is completed through the bypass capacitor 20. This action heats the plasma gas which flows through the orifice 13. The orifice 13 directs the heated plasma stream from the cathode electrode 11 towards the tip of the wire feedstock 14 which is connected to the positive terminal of the power supply 17. The plasma arc attaches to or "transfers" to the wire tip and is thus referred to as a transferred arc. The wire feedstock 14 is advanced forward by means of the wire feed rolls 16a and 16b, which are driven by a motor which is not shown. When the arc melts the tip of the wire, the high-velocity plasma jet impinges on the wire tip and carries away the molten metal, simultaneously atomizing the melted metal into fine particles and accelerating the thus formed molten particles to form a high-velocity spray stream entraining the fine molten particles.

In order to initiate the transferred plasma arc a pilot arc must be established. A pilot arc is an arc between the cathode electrode 11 and the constricting nozzle 10. This arc is sometimes referred to as a non-transferred arc because it does not transfer or attach to the wire feedstock as compared to the transferred arc which does. A pilot arc provides an electrically conductive path between the cathode electrode 11 within the plasma transferred wire arc torch and the tip of the wire feedstock 14 so that the main plasma transferred arc current can be initiated. The most common technique for starting the pilot arc is to strike a high frequency or a high voltage direct voltage (d.c.) spark between the cathode electrode 11 and the constricting nozzle 10. A pilot arc is established across the resulting ionized path generating a plasma plume. When the plasma plume of the pilot arc touches the wire tip, an electrically conductive path from the cathode electrode to the anode wire tip is established. The constricted transferred plasma arc will follow this path to the wire tip.

In the practical use of the plasma transferred wire arc thermal spray process for the spraying of electrically conductive wires or rods, there are several problems which are encountered. One of these problems is a condition known as "double arcing". Double arcing can occur as a result of one of several causes such as malfunction of the wire feed system, a kink in the wire or inadvertently shutting off the wire feeder. The result of the phenomena of double arcing can be serious damage to the constricting nozzle as well other components used to guide the wire into the plasma transferred arc. The problem of double arcing has been dealt with in one manner as described in our U.S. Pat. Nos. 5,296,667 and 5,442,153.

Another problem exists with the practical use of the plasma transferred wire arc process occurs due to the electrical potential difference that exists between the wire and the constricting nozzle. As a result of this potential difference, metal dust is attracted to the face of the constricting nozzle. As this metallic dust builds up, various conditions of electrical shorting between the constricting nozzle and the anode wire can occur. This electrical shorting creates major damage to the plasma transferred wire arc torch components. In addition, a major problem has been found when any form of wire feed hesitation occurs. Wire hesitation can be caused by any one of a number of reasons all dealing with either the wire surface condition (i.e kinks in the wire or other surface irregularities) or malfunctioning of the wire feed mechanism or wire feeder. The result of wire feed hesitation is the tendency of the transferred-arc to burn back along the wire, resulting in severe damage to wire guiding and support components of the plasma transferred wire arc gun head. As can be seen in FIG. 1, it is necessary to provide both electrical contact to the wire 14 as well as providing close alignment of the wire to the centerline of the plasma jet stream in order to assure complete and uniform melting of the wire tip as it advances into the plasma transferred arc.

Additionally, in operation of the prior art apparatus and method of coating bores, build-up of coating material can form on the outer surface of the torch which faces the surface being coated. This occurs especially in coating of small bores because a small part of the molten particles which are being propelled to the substrate do not adhere to the substrate but bounce back onto the torch surface. Since, in the operation of the prior art, it is necessary to maintain a 90° geometric relationship between the pilot nozzle face and the axis of the wire in order to prevent secondary arcing, the hot molten particles will bounce directly back to the plasma torch assembly since the angle of incidence is 90° and therefore the angle of reflection will also be generally 90°. This build-up of metal particles can be detrimental to the proper performance of the plasma transferred wire arc torch since it can cause electrical shorting of various component of the torch as well as interfering with the proper flow of gases from the various orifices of the pilot nozzle.

In addition, problems can occur during the starting of the spraying process which causes a "spit" or large molten globule to be formed and propelled to the substrate and included into the coating as the coating builds up on the substrate. This problem occurs due to the variable time delay of between 50 and 100 milliseconds that can occur between the time the transferred-arc power supply and the wire feeder are energized and the time the transferred-arc is fully established. Based on a typical wire feed rate of 160 inches per minute, and a variable time delay period of 50 milliseconds, more than ⅛th inch of wire can move past the arc point before the transferred-arc starts melting the wire. This extension of ⅛th inch of wire is what can form into the "spit" or globule. Since there is a variable period of 50 milliseconds, the problem cannot be solved by simply controlling the starting point of the wire feeder or establishing a predetermined acceleration rate of the wire feed rate.

Accordingly, it is an object of the present invention to provide an improved plasma transferred wire arc thermal spray apparatus and method which solves the above described problems.

A further object of the present invention is to provide a plasma transferred wire arc thermal spray method and apparatus in which an extended plasma arc jet is created and which is employed as a electrical contacting means to a metal wire as well as acting to atomize and propel molten metal particles to a substrate to form a high density coating while eliminating the arc burn back along the wire.

Another object of the present invention is to provide an improved plasma transferred wire arc thermal spray apparatus and method in which an extended plasma arc jet is created and which is employed as a electrical contacting means to a metal wire as well as acting to atomize and propel molten metal particles to a substrate to form a high density coating while avoiding the formation of a "spit" at the onset of the spraying process.

Yet another object of the present invention is to provide an improved plasma transferred wire arc thermal spray apparatus and method which eliminates metal dust attraction to the face of the constricting nozzle.

Still another object of the present invention is to provide an improved plasma transferred wire arc thermal spray method and apparatus which eliminates secondary arcing between a wire feed and the constricting nozzle.

It is another object of this invention to provide and improved plasma transferred wire arc thermal spray method and apparatus which eliminate the occurrence of build-up of metal particle on the outer surface of the torch assembly.

A further object of the present invention is to provide a apparatus and method for producing high performance, well bonded coatings which are substantially uniform in composition and have a very high density with very low oxide content formed within the coating.

A further object of the present invention is to provide an improved plasma transferred wire arc apparatus and method which is simple in construction and may be operated at relatively low gas consumption and is relatively maintenance-free.

It is a further object of the present invention to provide an improved plasma transferred wire arc thermal spray method and apparatus which can be utilized to apply a thermal spray coating to the inside of cylinder bores such as automobile engine cylinder bores, by rotating the plasma transferred wire arc torch around the axis of the wire.

SUMMARY OF THE INVENTION

The plasma transferred wire arc thermal spray apparatus and method of this invention will form extremely dense materials as coatings or as free standing near-net-shape forms while eliminating the problems associated with the prior art described above. The apparatus and method of this invention can produce an extended-arc and supersonic plasma jet stream. A metal wire, acting, as the anode, is continuously fed into the plasma jet stream, where the extended plasma arc attaches itself to the wire tip, melting the wire and the supersonic plasma jet stream then atomizes and propels the atomized molten metal particles to form extremely dense coatings. The plasma transferred wire arc thermal spray apparatus and method of this invention may also be utilized to coat internal concave surfaces, such as the bores of aluminum engine blocks, with a dense wear resistant coating, such as mild steel.

The plasma transferred wire arc thermal spray apparatus of this invention includes a plasma generating torch assembly having a cathode and a nozzle at least partially surrounding a free end of the cathode in spaced relation including a restricted nozzle orifice opposite the cathode free end. Plasma gas is fed into the nozzle under pressure through a port spaced from the restricted nozzle orifice. The plasma gas surrounds the cathode and exits the restricted nozzle orifice. In the most preferred embodiment, the plasma gas is fed tangentially into an annular nozzle chamber creating a vortex flow around the cathode. In certain applications, however, laminar plasma gas flow is preferred, wherein a baffle may be inserted into the nozzle gas chamber to produce laminar gas flow.

The wire metal feedstock, acting as the anode, is continuously fed into the plasma jet stream. A plasma transferred-arc is established between the free end or tip of the wire feedstock, melting the wire feedstock free end and the plasma jet stream atomizes and propels the molten feedstock toward the surface to be coated.

In the preferred embodiments of the plasma transferred wire arc thermal spray apparatus and method of this invention, the wire feedstock and nozzle are maintained at the same positive electrical potential with respect to the cathode, thereby eliminating double arcing and metallic dust buildup due to electrical potential differences between the wire and nozzle. Further, in the preferred embodiments of the apparatus and method of this invention, a separate pilot power supply is utilized and, with proper timing of the start sequence, it is possible to eliminate the occurrence of "spit" formation on starting the spray cycle. The spray cycle is initiated by a high voltage direct current power source having a negative terminal operably connected to the cathode to establish a negative cathode electrical potential and a positive terminal operably connected to the nozzle to establish a positive nozzle electrical potential, thereby initiating an electric arc between the cathode and nozzle. A pilot plasma direct current power supply having a negative terminal connected to the cathode and a positive terminal connected to the nozzle is then initiated to increase the energy state of the electric arc, thereby extending the electric arc through the nozzle orifice and forming a constricted plasma arc which attaches itself to the free end of the wire feedstock. In the absence of the wire feedstock being properly positioned opposite the restricted nozzle orifice, the extended constricted plasma arc will then bend back or "hairpin" back to the nozzle or orifice face. This eliminates burn back along the wire and damage to the surrounding components of the plasma transferred wire arc torch. Finally, a separate direct current main power supply is initiated having a negative terminal connected to the cathode and a positive terminal operatively connected to the wire feedstock to increase the energy state of the constricted plasma arc and transfer the plasma arc to the wire feedstock free end. In the most preferred embodiment of the apparatus and method of this invention, the wire feedstock and nozzle are electrically connected together to maintain the same positive electrical potential in the nozzle and the wire feedstock, eliminating double arcing and metallic dust build up.

Where the plasma transferred wire arc thermal spray apparatus of this invention is utilized as a bore coater, the plasma generating torch assembly including the cathode and nozzle are rotatably mounted about a longitudinal axis of the wire feedstock while maintaining the same positive electrical potential of the nozzle and wire feedstock, thus achieving the advantages of the apparatus and method of this invention in a bore coating apparatus. In the most preferred embodiment, the wire is fed longitudinally through a tubular electrically conductive wire guide and the wire guide is in continuous electrical contact with the nozzle. The positive terminal of the main power source is then connected to the conductive wire feed guide to maintain the same positive electrical potential of the wire feedstock and the nozzle. In a bore coating apparatus, the torch assembly may be rotatably mounted on a rotating member having a bore which receives the wire guide which is maintained in electrical contact with the anode nozzle.

In a preferred embodiment of the apparatus and method of this invention, particularly where a vortex gas flow is utilized in the nozzle, a conical second gas shroud surrounding the constricted plasma arc may be utilized to accelerate and stabilize the plasma jet stream. In this embodiment, the apparatus includes a second gas source and the nozzle includes a generally annular conical gas port surrounding the restricted nozzle orifice connected to the second gas source. This annular conical port directs the second gas preferably to a point downstream from the free end of the wire feedstock, such that the annular conical stream of the second gas surrounds the wire feedstock free end. In the disclosed embodiment, the nozzle includes a plurality of spaced converging gas ports surrounding the restricted nozzle orifice generating the conical second gas stream. The preferred apparatus further includes a gas port opening around the wire guide connected to the second gas source which directs gas around the wire guide, cooling the wire guide and the wire feedstock.

In the prior plasma transferred wire arc thermal spray apparatus disclosed in our above referenced U.S. patents, it was necessary to feed the wire feedstock into the plasma transferred arc at a transverse angle such that no portion of the wire is closer to the plasma transferred-arc than the leading edge of the wire feedstock in the feeding direction. Thus, the longitudinal axis of the wire feedstock was generally perpendicular to the constricted plasma arc. The molten atomized feedstock wire particles would then bounce directly back to the apparatus since the angles of incidence and reflection were 90°. This problem may also be eliminated with the apparatus and method of this invention because the wire feedstock and nozzle have the same electrical potential. Thus, in a preferred embodiment of the apparatus and method of this invention, the longitudinal axis of the wire feedstock defines an angle of less than 90° to the plasma transferred arc, such that the angle of reflection of the atomized particles or bounce back from the surface being coated is greater than 90°, eliminating this problem.

The method of this invention utilizing the improved plasma transferred wire arc thermal spray apparatus of this invention described above includes directing a plasma gas under pressure into the nozzle which surrounds the cathode and exits the restricted nozzle orifice. After start-up, the method of this invention then includes generating a constricted plasma arc between the cathode and the wire feedstock free end while maintaining generally the same positive electrical potential between the wire feedstock and the nozzle. The constricted plasma arc then melts the wire tip or free end of the wire feedstock and the plasma exiting the restricted nozzle orifice atomizes the molten feedstock and propels the atomized molten feedstock toward the surface to be coated, forming a dense metallic coating as described above. The preferred start-up procedure includes initiating an electrical pilot arc between the cathode and the nozzle by creating an electrical potential differential therebetween, wherein the cathode has a negative electrical potential and the nozzle has a positive electrical potential. The method then includes extending the electric arc through the restricted nozzle orifice by increasing the electrical energy of the electric arc and forming a constricted extended plasma arc which bends back to the nozzle or the orifice face, as described above. Finally, the method includes transferring the constricted extended plasma arc from the nozzle to the free end of the wire feedstock using a separate main power source by creating an electrical potential between the wire feedstock free end and the cathode, wherein the wire feedstock and nozzle have the same positive electrical potential as described above. In the most preferred method of this invention, as described above, the plasma gas is directed under pressure tangentially into an annular nozzle chamber surrounding the cathode to create a vortex flow around the cathode and exiting the restricted nozzle orifice.

The method of coating an interior concave surface, such as an interior surface of a bore of this invention includes directing a plasma gas from a source of plasma gas into the nozzle which surrounds the nozzle and exits the restricted nozzle orifice. The method then includes generating a constricted plasma arc between the cathode and the wire tip or free end of the wire feedstock, thereby melting the wire feedstock free end and wherein the constricted extended plasma arc atomizes the molten feedstock and propels the atomized molted feedstock forward the internal concave surface. Finally, this method includes rotating the plasma generating torch assembly about the longitudinal axis of the wire feedstock while maintaining electrical connection between the wire feedstock and the nozzle, thereby propelling the atomized molten feedstock arcuately to coat the interior concave surface. Where this method is utilized to coat the interior surface of a bore, the apparatus is simultaneously reciprocated through the bore as the plasma torch assembly is rotated about the longitudinal axis of the wire feedstock providing continuous uniform coating on the internal surface of the bore. Thus, the transferred arc is sustained as the plasma generating torch assembly is caused to rotate concentrically about the wire axis, thus causing continuous melting of the free end of the wire feedstock, while the plasma jet is simultaneously atomizing and accelerating molten atomized droplets formed on the wire tip and propelling them against the interior wall of the bore structure. Simultaneously, the entire assembly reciprocates through the bore. The plasma transferred wire arc bore coating apparatus of this invention may also be utilized to simultaneously coat a plurality of bores, such as the bores of an engine block, by mounting a plurality of parallel rotatably mounted plasma transferred wire arc apparatuses of this invention mounted on a reciprocating support.

These and other advantages of the plasma transferred wire arc thermal spray apparatus and method of this invention will be more fully understood from the following description of the preferred embodiments, the appended claims and the drawings, a brief description of which follows.

DETAILED DESCRIPTION OF THE PREFERRED EMBODIMENTS

Figure 2A:
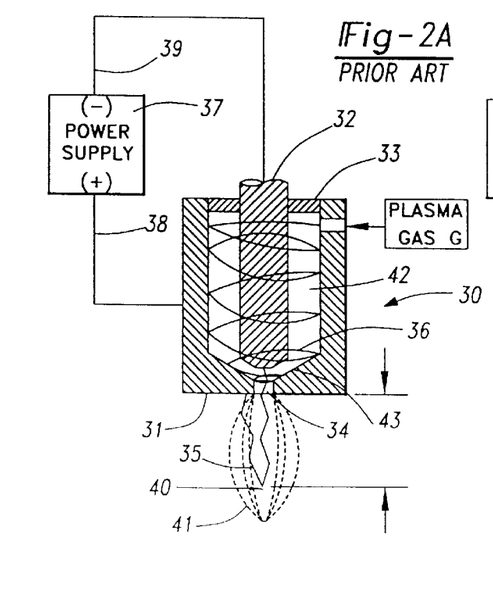
FIG. 2a is a representation of a prior art example of a plasma torch producing an extended plasma arc with laminar flow of the plasma forming gas.
Figure 2B:
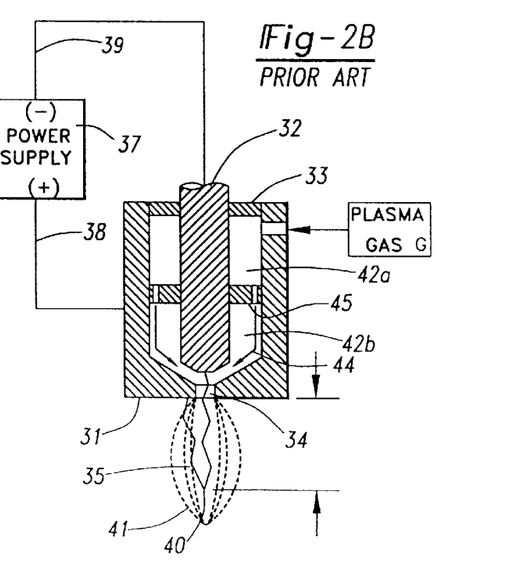
FIG. 2b is a representation of a prior art example of a plasma torch producing an extended plasma arc with a vortex plasma gas flow.

Reference is now made to FIGS. 2a and 2b which are representations of a plasma torch producing an extended plasma arc 35 from a vortex plasma gas flow 36 (FIG. 2a) and a laminar plasma gas flow 44 (FIG. 2b). FIG. 2a illustrates the condition where a strong plasma vortex is formed and caused to flow through a constricting nozzle 31 with a short constricting orifice 34. The plasma arc 35 will extend from the tip or free end of the cathode 32 through the low pressure zone formed in the center of the plasma gas vortex to some distance, which represents the maximum arc extension at which point 40 the arc will bend or "hairpin" back to the face of the nozzle 31 through the plasma sheath 41 which surrounds the plasma arc. The total length of the "hairpin" arc 35 from the tip of the cathode 32 to the maximum arc extension point 40 back to the face of the nozzle 31 establishes the plasma arc voltage. The length of the extended plasma arc 35 is affected by the magnitude of the plasma arc current which flows from the positive terminal of the constant current power supply 37 through lead 38 to the constricting plasma nozzle 31 and returns to the power supply 37 from the cathode 32 through lead 39 to the negative terminal of the power supply 37. The cathode 32 is electrically isolated from the constricting nozzle 31 by means of insulating member 33 which closes off the back of the constricting nozzle 31 forming an annular nozzle chamber 43 surrounding the cathode 32. Plasma gas is introduced, into the chamber 43 thus formed, tangentially under pressure to cause a vortex gas flow 36 to be formed. The plasma gas exits from the chamber 42 through the conical section 43 leading to the constricting orifice 34. The principle of conservation of angular momentum creates an intense vortex flow with a reduction of the outer diameter of the gas flow. A small diameter core of the vortex thus formed exhibits a low pressure zone relative to the gas pressure near the wall of the orifice 34. An extended arc plasma column 35 results with the arc column positioned to pass through the low pressure zone and well beyond the exit of the constricting orifice 34 to a maximum plasma arc extension point 40 and then return to the face of the constricting nozzle 31 through the low pressure area surrounding the vortex flow.

FIG. 2b represents the condition where the plasma gas is caused to flow in a laminar manner through the constricting nozzle 31 which contains a short constricting orifice 34. The laminar flow is generated by means of causing the plasma gas G to pass from chamber 42a within the constricting nozzle to chamber 42b through a baffle plate 45 containing a large number of holes, each of which have a bore length greater that the diameter of the hole. This laminar gas flow proceeds through a uniform transition from the chamber 42b, through the constricting orifice 34. By means of establishing a high gas pressure in chamber 42b, which typically would be in excess of 100 psig (pounds per square inch gauge), the plasma arc will extend itself well beyond the exit of the constricting orifice 34 to a point 40 which represents the maximum arc extension length. From this maximum plasma arc extension point 40 the arc "hairpins" back to the face of the constricting nozzle through the low pressure area surrounding the higher pressure extended plasma which surrounds the extended plasma arc. The extension of the plasma arc for the case of the laminar plasma gas flow occurs in a similar manner to the way the arc extension occurs in the case of the vortex plasma gas flow with the exception that there is no low pressure zone formed in the center of the laminar plasma flow and therefore the arc does not extend as far in this case as compared to the vortex condition, all other conditions of plasma gas flow, pressure, and plasma current being the same.

Figure 3:
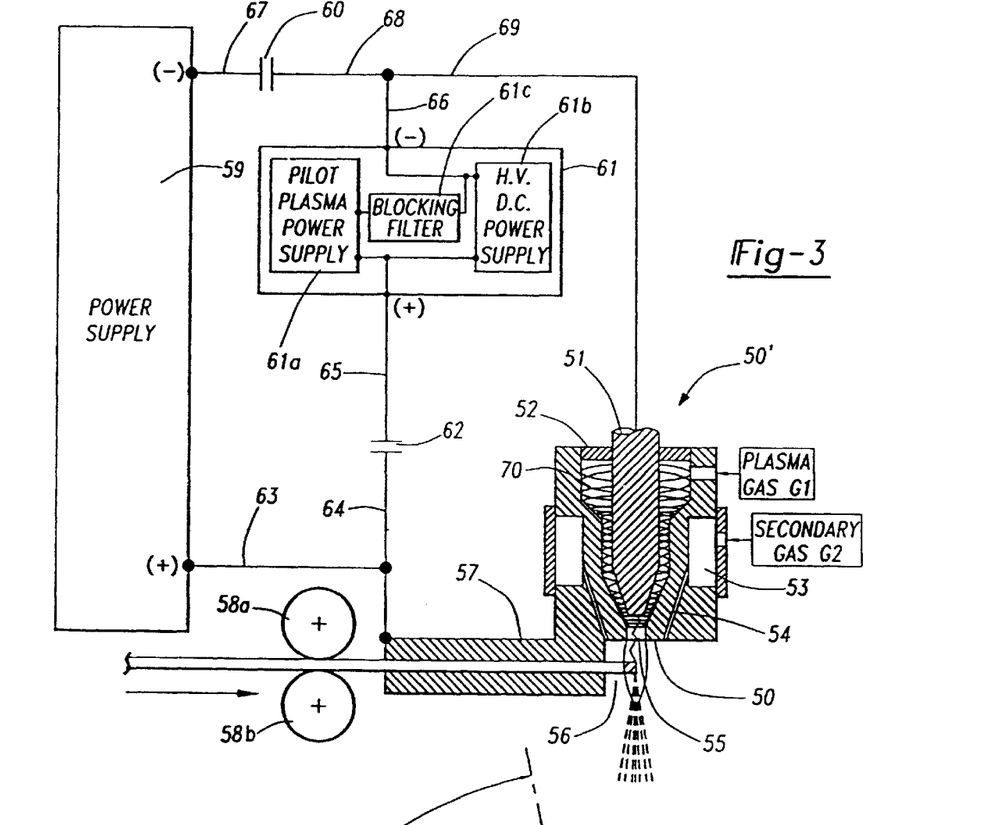
FIG. 3 is a schematic representation of a preferred embodiment of the present invention showing the configuration of an improved plasma transferred wire arc thermal spray system.

Referring to FIG. 3, a preferred embodiment of the present invention is shown in schematic form. A plasma-transferred-arc torch 50' is shown consisting of a constricting nozzle 50 which is in the form of a cylindrical body which may be made of a conductive material such as copper, with a constricting orifice 55 located at one end of the cylindrical body and the other end is closed off with an insulating plate 52. A cathode electrode 51, which may be constructed from 2% thoriated tungsten, is located coaxial with the constricting nozzle 50 and electrically insulated from the constricting nozzle 50 by the insulating plate 52, forming an annular plasma gas chamber internally between the cathode electrode 51 and the inner walls of the constricting nozzle 50. In addition, a separate chamber 53 is formed within the outer section of the constricting nozzle 50 which is connected to a plurality of inwardly angularly spaced bores 54 formed within the constricting nozzle 50. A wire contact tip and wire guide 57 is electrically in contact with the constricting nozzle 50, through which a wire 56 is constantly fed by means of wire feed rolls 58a and 58b. Wire feed rolls are driven by means of a conventional motor, not shown. The electrical circuitry that is associated with the operation of the plasma-transferred-arc torch 50' consists of a pilot power supply assembly 61, the negative terminal of which is connected through electrical leads 66 and 69 to the cathode electrode 51. The pilot power supply assembly consists of a direct current (d.c.) constant current pilot power supply 61a and a high voltage d.c. power supply 61b which is in an electrically parallel connection across the pilot power supply. A suitable pilot power supply assembly is Model "PowerPro 55" available from Smith Equipment Division of TESCOM Corp. A high voltage d.c. blocking filter 61c is located in the negative leg of the high voltage power supply 61b which prevents any high voltage from feeding back into the pilot power supply 61a. The positive terminal of the pilot power supply assembly 61 is connected through lead 65 to a pilot relay contact 62 which is connected through lead 64 to the wire contact tip or feedstock free end and wire guide 57 which is in electrical contact with the constricting nozzle 50. A separate main plasma transferred wire arc power supply 59 is also employed, the positive terminal being connected by means of lead 63 to the lead 64 which in turn is connected to the wire contact tip 57 and by means of electrical contact connected to the constricting nozzle as well as the wire 56. The negative terminal of power supply 59 is connected through lead 67 to the contacts of an isolation contactor 60 though lead 68 and lead 69 to the cathode electrode 51. A suitable main power supply is Model PCM-100 available from ESAB Welding and Cutting Products.

In operation, plasma gas enters through port G1 into the internal chamber of the constricting nozzle, tangential to the wall of the annular inner chamber of constricting nozzle 50 in a manner to form a vortex flow 70 being forced out of the constricting orifice 55. A suitable plasma gas is a gas mixture consisting of 65% argon and 35% hydrogen. Other gases have also been used, such as nitrogen. In order to start the operation of the plasma transferred wire arc process, it is necessary to initiate a pilot plasma. To initiate a pilot plasma, the pilot plasma power supply 61a is activated and the positive terminal is connected through the pilot relay contactor 62 to the constricting nozzle 50 and the negative terminal is connected to the cathode electrode 51. Simultaneously, the high voltage power supply 61b is pulsed "on" for sufficient time to strike a high voltage arc between the cathode electrode 51 and the constricting nozzle 50. The high voltage arc thus formed provides a conductive path for the d.c. current from the pilot plasma power supply to flow from the cathode electrode 51 to the constricting nozzle 50. As a result of this added electrical energy, the plasma gas is intensely heated which causes the gas, which is in a vortex flow regime, to exit the constricting orifice at very high velocity, generally forming a supersonic plasma jet extending from the constricting orifice. The plasma arc thus formed is an extended plasma arc which initially extends from the cathode through the core of the vortex flowing plasma jet to the maximum extension point and then "hairpins" back to the face of the constricting nozzle. The high velocity plasma jet, extending beyond the maximum arc extension point provides an electrically conductive path between the cathode electrode 51 and the tip of the wire 56. As soon as the pilot plasma is established, the isolation contactor 60 is closed, adding additional power to the pilot plasma. With the wire 56 positioned at a distance from the cathode electrode 51 such that the distance is equal to, or slightly less than, two times (2×) the length from the cathode electrode 51 to the maximum arc extension point, as defined by FIGS. 2a and 2b, the extended plasma arc will transfer from the face of the constricting nozzle 50 to the tip of the wire 56 thus causing the wire tip 56 to melt as it is being continuously fed into the plasma jet. A secondary gas entering through port G2, such as air, is introduced under high pressure into chamber 53. Chamber 53 acts as a plenum to distribute this secondary gas to the series of angularly spaced nozzle ports 54. The flow of this secondary gas provides a means of cooling the constricting nozzle 50 as well as providing an essentially conically shaped flow of gas surrounding the extended plasma arc. This conically shaped flow of high velocity gas intersects with the extended plasma jet downstream of the tip of the wire 56, thus providing addition means of atomizing and accelerating the molten particles formed by the melting of the wire 56.

Figure 4:
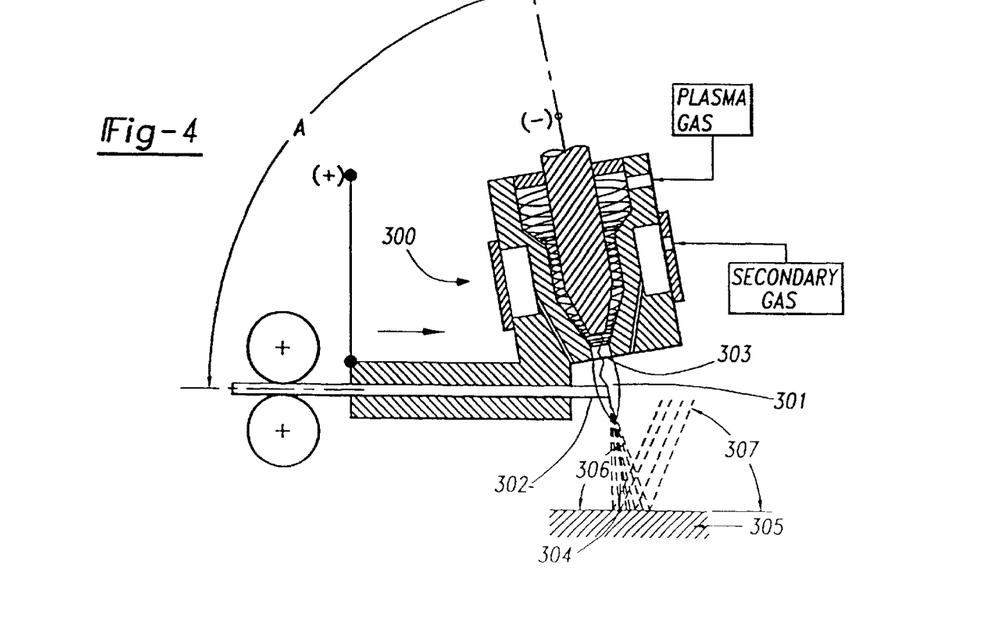
FIG. 4 is a side cross-sectional schematic illustration of an alternative embodiment of the plasma torch assembly.

Another embodiment of the present invention shown schematically in FIG. 4 illustrates an arrangement in which the main portion of the torch body is arranged so that the axis of the plasma stream 301 emanating from the constricting orifice 303 is at an included angle 306 of less than 90° to the longitudinal axis of the wire 302. As a result of this configuration, the hot metal particle stream 304 being propelled to the substrate 305 impinges at an acute angle to the substrate 305 thereby establishing an angle of incidence 307 of less than 90°. Since the angle of incidence 306 is equal to the angle of reflection 307, those hot metal particle which bounce back from the substrate will not collect on the face of the torch so long as the angle of incidence is somewhat less than 90°. The actual angle would be dependent upon the specific dimensions of the face of the torch as well as the actual spray distance from the face of the pilot nozzle to the substrate surface; however, an angle of 75° to 85° will eliminate the problem. The ability to operate the plasma transferred wire arc torch 300 so that at an angle 306 between the wire axis and the axis of the plasma stream 301 of less than 90° is only possible since the wire and the nozzle arc are at the same electrical potential, otherwise double arcing would occur.

Figure 5:
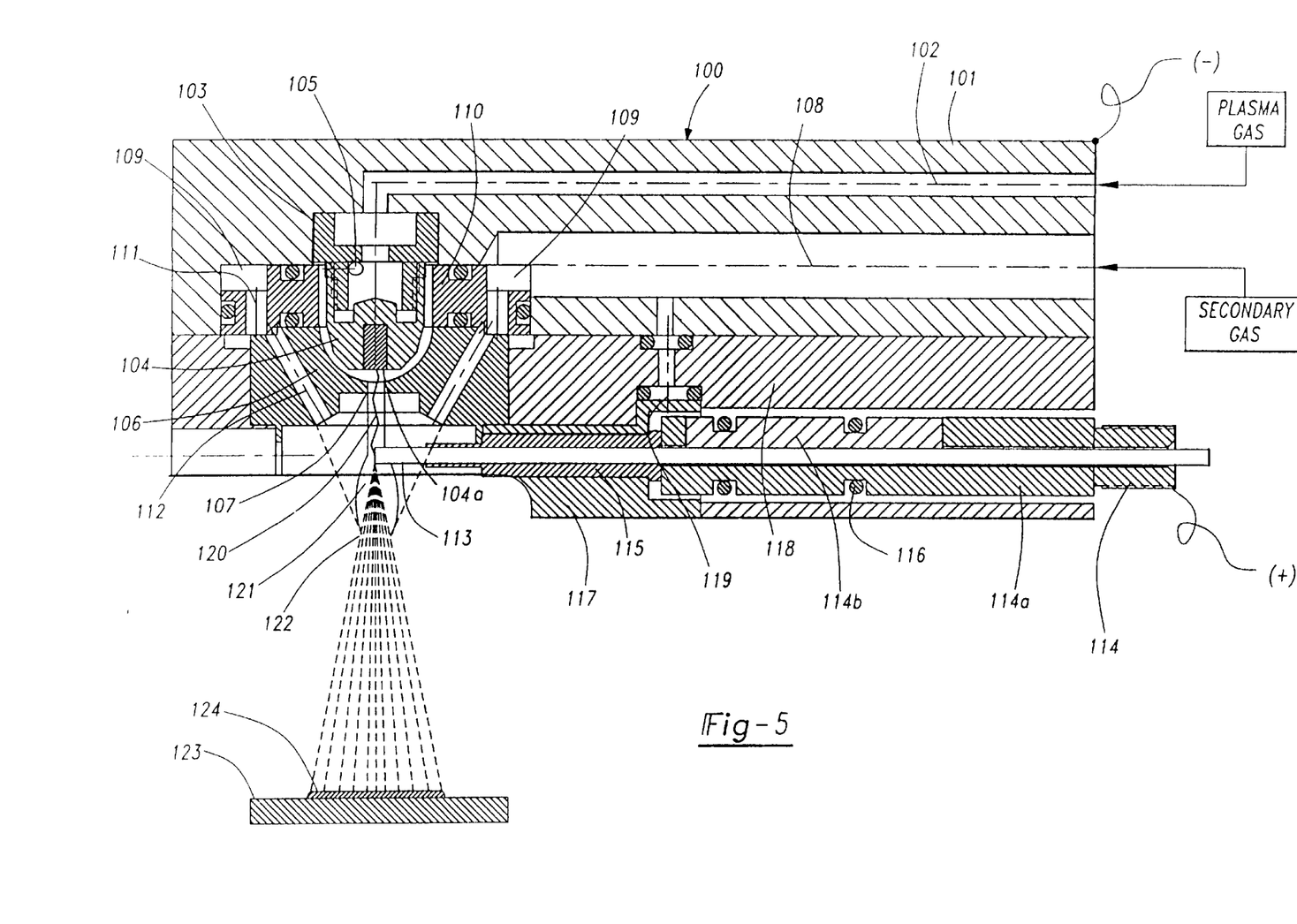
FIG. 5 is a side cross-sectional view of a preferred embodiment of the plasma transferred wire arc thermal spray apparatus of this invention.

Reference is now made to FIG. 5 in which a detailed view of a commercial embodiment of a plasma transferred wire arc torch assembly 100 is shown. The plasma transferred wire arc torch assembly 100 consists of a torch body 101 containing a plasma gas port 102 and a secondary gas port 108. The torch body 101 may be formed of an electrically conductive metal such as brass. The plasma gas is connected by means of port 102 to a cathode holder 103 through which the plasma gas flows into the inside of the cathode assembly 104 and exiting through tangential ports 105 located in the cathode holder 103. The plasma gas forms a vortex flow between the outside of the cathode assembly 104 and the internal surface of the pilot plasma nozzle 106 and then exiting through the constricting orifice 107. The benefit of the plasma gas flowing inside the cathode assembly 104 before exiting to form a vortex flow is that it provides substantial cooling of the heat being dissipated by the cathode function. The cathode assembly 104 may consist of a copper housing containing a insert 104a of a high temperature material possessing a high work function such as 2% thoriated tungsten. The cathode assembly 104 is attached to the cathode holder 103 by means of a threaded section on each of the two parts (103 and 104). Secondary gas enters the plasma transferred wire arc torch assembly 100 through gas inlet port 108 and through port 108 which directs the secondary gas to a gas manifold 109 which is a cavity formed between baffle plate 110 and torch body 101. The material of the baffle plate 110 must possess high temperature, electrically insulating properties. This material may be, for example, a polyamide or polyimide. The secondary gas flow is uniformly distributed through the multiple ports 111 to a second manifold cavity, not shown, formed between the pilot nozzle 106 and the baffle plate 110 and then through the angularly spaced bores 112 concentrically surrounding the outside of the constricting orifice 107. The flow of this secondary gas through the angularly spaced bores 112 within the pilot nozzle 106 provides the function of cooling the pilot nozzle 106 from the heat normally generated by its function as well as providing other useful purposes which will be described later. A wire feedstock 113 is fed uniformly and constantly through a wire contact tip 114, the purpose of which is to make firm electrical contact to the wire feedstock 113 as it slides through the wire contact tip 114 and is composed in this embodiment of two pieces (114a and 114b) which are held in spring or pressure load contact with the wire feedstock 113 by means of rubber rings 116 or other suitable means. The wire contact tip is made of a high electrical conducting material such as copper. As the wire exits the wire contact tip 114 it enters a wire guide tip 115, generally made of a high hardness material such as hardened tool steel. The purpose of the wire guide tip is to guide the wire feedstock 113 into precise alignment with axial centerline of the critical orifice 107. The wire guide tip 115 is supported in a wire guide tip block 117 which may be formed of brass. The wire guide tip block 117 as well as the wire contact tip are contained within a insulating block 118 which provides electrical insulation between the main body 101 which is held at a negative electrical potential and the wire guide tip block 117 and the wire contact tip 114 which are held at a positive potential. A small port 119 in insulator block 118 allows a small amount of secondary gas to be diverted to flow through wire guide tip block 117 in order to provide heat removal from the block 117. The wire guide tip block 117 is maintained in pressure contact with the pilot nozzle 106 providing an electrical connection between the pilot nozzle 106 and the wire guide tip block 117. Electrical connection is made to the main body 101 and thereby to the cathode assembly 104 through the cathode holder 103 from the negative terminal of pilot power supply 61 (FIG. 3) as well as from the negative terminal of the main power supply 59 (FIG. 3) through the isolation contactor 60 (FIG. 3) by means of electrical lead 61 (FIG. 3). The positive electrical connection is made to the wire contact tip 114 of plasma transferred wire arc torch 100 from the pilot power supply 61 (FIG. 3) through the pilot-arc relay contactor 62 (FIG. 3) and through lead 64 (FIG. 3). Positive electrical connection is also made to the wire contact tip 114 from the main power supply 59 (FIG. 3) through lead 63 (FIG. 3) which connects to lead 64 (FIG. 3).

Wire 113 is fed towards the central axis of the plasma transferred wire arc torch assembly 100. The central axis of the wire is spaced approximately 4.5 mm from the face of the pilot nozzle 106. The cathode assembly 104 is electrically energized with a negative charge and the wire 113 as well as the pilot nozzle 106 is electrically charged with a positive charge.

To initiate the operation of the system, after operating an ON control switch (not shown), plasma gas is caused to flow through port 102 to the plasma transferred wire arc torch. After an initial period of time of approximately 2 seconds, the pilot power supply 61a (FIG. 3) and high voltage d.c. power supply 61b (FIG. 3) as well as the pilot-arc relay contactor 62 are energized simultaneously causing a pilot plasma to be momentarily activated. Alternatively a high frequency power supply may be functionally substituted for the high voltage power supply 61b (FIG. 3). At the same time these events are occurring, the main power supply 59 (FIG. 3) is energized and at the moment the pilot plasma is established, the high voltage d.c. power supply 61b (FIG. 3) is de-energized and the isolation contactor 60 (FIG. 3) is closed. As this occurs, additional energy is added to the pilot plasma and along with the intense vortex flow of the plasma gas, an extended pilot plasma arc is established. This extended plasma-arc provides the electrical path for the plasma arc to transfer from the nozzle to the tip to the wire 113. Simultaneous with the closing of the isolation contactor 60 (FIG. 3), the wire is fed by means of wire feed rolls 58a (FIG. 3) and 58b (FIG. 3) into the thus formed extended transferred plasma arc thus sustaining the transferred arc even as the tip of the wire 113 is melted off. As wire 113 is continuously fed, the tip of the wire 113 is melted by the intense heat of the transferred arc 120 and its associated plasma 121 which surrounds the transferred arc 120. Molten metal droplets are formed on the tip end of the wire 113 which are accelerated and initially atomized into fine molten particles by the viscous shear force established between the high velocity, supersonic plasma jet and the initial low velocity of the molten droplets. The molten droplets are further atomized and accelerated by the much larger mass flow of secondary gas which converges at a converging zone 122 beyond the flow of the plasma stream 121 now containing the finely divided, accelerated particles of molten material which are propelled to the substrate surface 123 where a deposit 124 is formed.

During operation of the system, in the event of a hesitation or halting of the wire feed, melt-back of the tip of the wire 113 will occur. This hesitation or halting in wire feed can randomly occur due to certain wire feed inconsistencies caused by wire slippage on the feed rolls or kinks in the wire 113. When melt-back of the wire 113 occurs, the tip of the wire 113 moves back out of the plasma plume 121. By providing a plasma transferred wire arc torch apparatus in which the wire 113 and the pilot plasma nozzle 106 are electrically connected together to establish the same positive electrical potential, the extended plasma arc will "hairpin" return to the pilot nozzle rather than continuing to cause further melt back of the tip of the wire 113. In this instance, destruction of the wire guide tip as well as other torch components in that surrounding area which would otherwise occur, is prevented. This is a benefit over the prior art which required critical geometric relationships to be established between the wire and surrounding components of the plasma transferred wire arc torch which were maintained at an electrical potential difference between the wire and wire guide.

Furthermore, this improved method and apparatus consists of an arrangement in which the pilot nozzle 106 of plasma transferred wire arc torch 100 and the wire 113 and all components (wire guide tip 115, wire guide tip block 117, and wire contact tip 114) associated with the wire 113 are electrically connected together, are not operating at any electrical potential difference between them. As a result, of the essentially zero electrical potential difference between the wire 113 and the pilot nozzle 106, there is no electric charge attraction which could cause metallic or conductive dust to be attracted to the face of the pilot nozzle. In the operation of the prior art, a potential difference was established between the wire and the pilot nozzle thereby causing metallic dust to be attracted to the pilot nozzle face. When this dust built up with the prior art devices, it would cause electrically conductive paths between the pilot nozzle and surrounding components associated with the wire causing arc-tracking to occur between these components and resulting in severe damage and/or destruction of these component parts. This condition is eliminated by employing the improved method and apparatus described herein.

Furthermore, the improved method and apparatus in which the pilot plasma nozzle 106 and the wire 113 are electrically connected together, the plasma transferred wire arc torch 100 is of simpler construction since separate electrical connections are not required for the pilot nozzle 106 and the wire 113. The prior art apparatus required an electrical connection to the pilot nozzle and a separate electrical connection to the wire. This arrangement in the prior art required a much more complex physical configuration of the plasma transferred wire arc torch since the pilot nozzle electrical connection carried not only a d.c. potential difference but also the high frequency potential which had to be insulated from d.c. electrical potential of the wire. Since the improved method and apparatus of this invention only requires one electrical connection to the wire 113 and the pilot nozzle 106 which are electrically common to each other, only one lead is required to carry both the d.c. power as well a the high voltage starting pulse thereby simplifying the construction of the plasma transferred wire arc torch 100.

Figure 6:
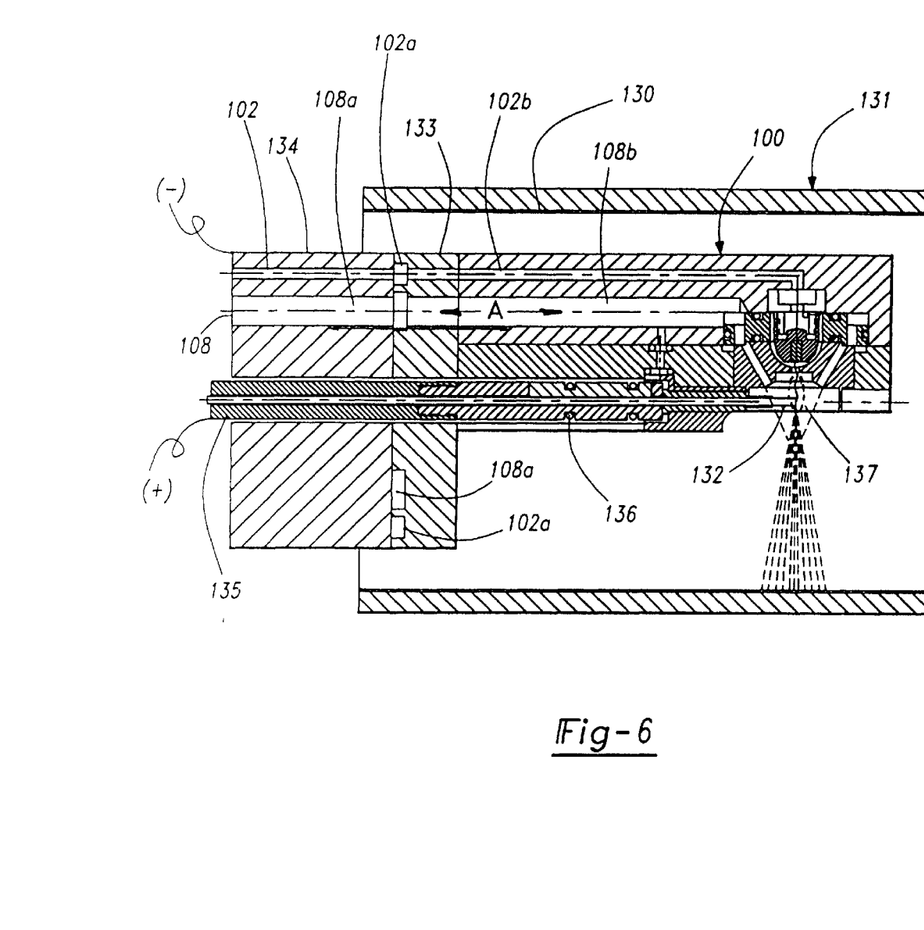
FIG. 6 is a side cross-sectional view of a preferred embodiment of a plasma transferred wire arc bore coating thermal spray apparatus of this invention.
Figure 7:
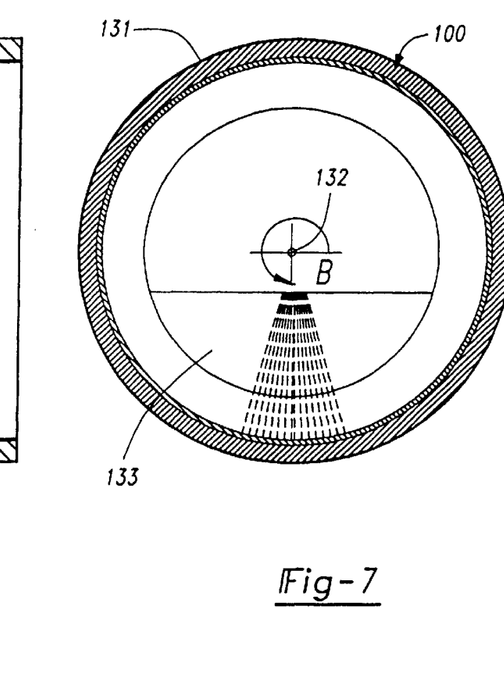
FIG. 7 is an end view of the apparatus shown in FIG. 6.

Reference is now made to FIGS. 6 and 7 in which a cross-section and end view of a plasma transferred wire arc torch assembly 100 to be employed in a manner suitable for depositing a uniform coating 130 on a concave surface such as the bore 131 shown. This embodiment includes a plasma transferred wire arc torch assembly 100 similar to the plasma transferred wire arc torch assembly 100 described in FIG. 5, the difference being that the plasma transferred wire arc torch assembly 100 is mounted on a rotating member 133 to allow rotation about the longitudinal axis of the wire feedstock 132 concentrically with respect to bore 131 by means of a motor drive, not shown.

A rotating member 133 is mounted on a stationary end plate 134. Rotating member 133 is fitted with an insulating wire feed conduit 135 extending through its rotation axis. Plasma transferred wire arc torch assembly 100 is mounted at an end f rotating member 133 opposite that of stationary end plate 134 so that the plasma jet 137 extends towards the axis of the wire feedstock 132. Wire 132 is fed on the central axis of the bore through wire feed conduit 135 which is kept electrically isolated from the rotating member 133 by means of the rigid electrically insulating wire feed conduit 135. The gas and electrical connections to the plasma transferred wire arc torch assembly 100 are brought through the stationary end plate 134 to and through the rotating member 133 to the plasma transferred wire arc torch assembly 100. Plasma gas is received through port 102 in stationary end plate 134 where it is then received in an annular chamber 102a in the rotating member 133 and transferred through the coaxially aligned port 102b in the body 100. Similarly, the secondary gas is received through port 108 in the stationary member 134 into annular chamber 108a which communicates with the nozzle through the coaxially aligned port 108b. Stationary end plate 134 is maintained in pressure contact with the end of rotating member 133 by pressure means, not shown, such as compression springs.

An extended transferred-plasma arc is established, as previously described, melting off the tip of the wire 132 as it is continuously fed into plasma jet 137. As it is melted off from the tip of the wire 132, the molten droplets are atomized and propelled by the plasma stream towards the inner wall of the bore 131. As the rotating member 133 and the plasma transferred wire arc torch assembly 100 are rotated in the direction of arrow B (FIG. 7), a coating 130 is deposited uniformly on the wall of the bore 131. While the deposit 130 is being formed by the rotational movement, the assembly consisting of the wire feed conduit 135, wire 132, stationary end plate 134, rotating member 133 and plasma transferred wire arc torch assembly 100 is reciprocated axially in the direction of arrow A, up and back within the bore 131 thereby causing the deposit 130 to form all along the circumference of the bore 131 as well as the length of the bore 131. By these combined motions and actions, bore 131 is completely covered with a uniform deposit 130. As will be understood, the angularly mounted bore coating plasma transferred wire arc thermal spray apparatus 300 shown in FIG. 4 may be similarly rotatably mounted to avoid bounce back of atomized molten particles to the nozzle from the internal surface of the bore 131.

As will be understood by those skilled in thermal spraying, the preferred wire feedstock or rod used in the apparatus and method of this invention will depend upon the application of the resultant coating. The wire may have a solid core of the same or different composition, such as a coextruded wire or rod having an outer sheath of one material and an inner core of a different material or a powder core surrounded by a tubular sheath. For example, iron based or alloyed materials are preferred for many applications, such as coating of bores subject to friction, including mild steels, carbon steels and stainless steels. Other applications may require aluminum, nickel, copper or bronze based or alloyed coatings, wherein the wire feedstock will comprise or include the preferred coating material. Special coatings and near net shapes may also be formed using powdered core wires, such as a compacted carbon powder core surrounded by an iron tubular sheath. The terms wire, wire feedstock and rod are synonymous terms. Finally, the plasma transferred wire arc thermal spray apparatus and method of this invention may also include a second feedstock, preferably introduced downstream of the disclosed wire feedstock as disclosed, for example, in our above-referenced U.S. Pat. Nos. 5,296,667 and 5,442,153, wherein a powdered feedstock is introduced into the plasma jet stream through a powder injection tube.

In the prior art, a plasma transferred wire arc torch was employed which inherently possessed certain deficiencies which caused significant downtime in the production usage of the device due to damage incurred to the apparatus. In addition, occasional "spitting" of the gun would cause defects in the deposit thereby causing parts coated by the prior art to be rejected and requiring such rejected parts to be discarded. The improved method and apparatus for applying a deposit to an internal surface of a bore which employs the improved plasma transferred wire arc torch assembly greatly reduces the occurrence of the events which otherwise reduces production rates and causes defective deposits requiring the discarding of product, thereby making the improved method and apparatus economically viable for use in high production applications such as the coating of the cylinder bores of automobile engine blocks.

Preferred embodiments of this invention have been disclosed; however, a worker of ordinary skill in the art would recognize that certain modifications would come within the scope of this invention. For that reason, the following claims should be studied in order to determine the true scope and content of this invention.

We claim:

1. A plasma transferred wire arc thermal spray apparatus for applying a coating to a surface comprising a cathode having a first negative electrical potential, a nozzle generally surrounding a free end of said cathode in spaced relation having a restricted orifice opposite said cathode free end, said nozzle having a second positive electrical potential, a source of plasma gas directing plasma gas into said nozzle surrounding said cathode and exiting said restricted nozzle orifice, and a wire feed continuously directing a free end of wire feedstock opposite said restricted nozzle orifice and said wire feedstock having the same second positive electrical potential as said nozzle, said apparatus thereby establishing a plasma transferred-arc between said wire feedstock free end and said cathode melting said wire feedstock free end and said plasma gas exiting said restricted nozzle orifice atomizing melted feedstock and propelling atomized melted wire feedstock toward said surface, thereby coating said surface.

2. The plasma transferred wire arc thermal spray apparatus defined in claim 1, wherein said cathode and said nozzle are rotatably mounted as an assembly about a longitudinal axis of said wire feedstock while maintaining said same second positive electrical potential of said nozzle and said wire feedstock, said cathode and nozzle assembly rotatable about said wire feedstock to direct said plasma transferred-arc rotatably through said longitudinal axis of said wire feedstock to coat an interior arcuate surface opposite said restricted orifice of said nozzle.

3. The plasma transferred wire arc thermal spray apparatus defined in claim 1, wherein said nozzle includes an enclosed annular chamber surrounding said cathode in spaced relation and an inlet port spaced from said restricted nozzle orifice defined at an angle relative to the axis of said annular chamber, said plasma gas directed into said enclosed annular nozzle chamber under pressure to create a vortex plasma gas flow around said cathode and exiting said restricted nozzle orifice.

4. The plasma transferred wire arc thermal spray apparatus defined in claim 2, wherein the angle between said longitudinal axis of said wire feedstock and said plasma transferred-arc is less than 90°.

5. The plasma transferred wire arc thermal spray apparatus defined in claim 2, wherein said wire feed includes a generally tubular electrically conductive wire guide through which said wire feedstock is fed to said nozzle restricted orifice in contact with said wire guide, and said wire guide in continuous electrical contact with said nozzle as said cathode and nozzle assembly is rotated about said longitudinal axis of said wire feedstock.

6. The plasma transferred wire arc thermal spray apparatus defined in claim 1, wherein said apparatus includes a high voltage direct current power source having a negative terminal operably connected to said cathode to establish a negative electrical potential of said cathode and a positive terminal operatively connected to said nozzle to establish a positive electrical potential of said nozzle, thereby initiating an electric arc between said cathode and said nozzle, a pilot plasma direct current power supply having a negative terminal connected to said cathode and a positive terminal connected to said nozzle to increase the energy state of said electric arc, thereby extending said electric arc through said restricted nozzle orifice and forming a constricted plasma arc, and a separate main direct current power supply having a negative terminal connected to said cathode and a positive terminal operatively connected to said wire feedstock to increase the energy state of said constricted plasma arc, said wire feedstock and said nozzle electrically connected to maintain the same second positive electrical potential in said nozzle and said wire feedstock, thereby extending said constricted plasma arc to said wire feedstock and establishing said plasma transferred-arc between said wire feedstock and said cathode.

7. The plasma transferred wire arc thermal spray apparatus defined in claim 1, wherein said apparatus includes a second gas source and said nozzle includes a generally annular conical gas port surrounding said restricted nozzle orifice connected to said second gas source, said port directing said second gas to a point downstream from said wire feedstock.

8. The plasma transferred wire arc thermal spray apparatus defined in claim 7, wherein said nozzle includes a plurality of spaced converging gas ports surrounding said restricted nozzle orifice generating a conical gas stream of said second gas surrounding said plasma transferred-arc.

9. The plasma transferred wire arc thermal spray apparatus defined in claim 7, wherein said wire feed includes a generally tubular wire guide through which said wire feedstock is fed to said nozzle restricted orifice, and said apparatus including a gas port opening around said wire guide and cooling said wire guide and said wire feedstock.

10. The plasma transferred wire arc thermal spray apparatus defined in claim 1, wherein the included angle defined between said plasma transferred-arc and said surface is less than 90°.

11. A plasma transferred wire arc bore coating apparatus comprising a plasma generating torch assembly including a cathode and a nozzle at least partially surrounding a free end of said cathode in spaced relation having a restricted nozzle orifice opposite said cathode free end, a wire feeder continuously directing a free end of wire feedstock opposite said restricted nozzle orifice, a power source and a source of plasma gas directing plasma gas into said nozzle surrounding said cathode and exiting said restricted nozzle orifice, said power source having a negative terminal operably connected to said cathode to establish a negative electrical potential of said cathode and a positive terminal operably connected to said wire feedstock to establish a positive electrical potential of said wire feedstock and said wire feedstock operably electrically connected to said nozzle to establish a positive electrical potential of said nozzle which is the same positive electrical potential as said wire feedstock, said plasma generating torch assembly generating a constricted plasma arc between said cathode and said wire feedstock free end thereby melting said wire feedstock free end and said plasma gas exiting said nozzle orifice atomizing molten feedstock and propelling atomized molten feedstock toward an internal surface of said bore, and said plasma generating torch assembly rotatably mounted to rotate about a longitudinal axis of said wire feedstock while maintaining said electrical connection to said nozzle, thereby directing said atomized molten feedstock rotatably to coat said internal surface of said bore.

12. The plasma transferred wire arc bore coating apparatus defined in claim 11, wherein said wire feed includes a generally tubular electrically conductive wire guide through which said wire feedstock is fed to said nozzle restricted orifice in electrical contact with said wire guide, and said wire guide in continuous electrical contact with said nozzle as said plasma generating torch assembly is rotated about said longitudinal axis of said wire feedstock.

13. The plasma transferred wire arc bore coating apparatus as defined in claim 11, wherein said apparatus includes a high voltage direct current power source having a negative terminal operatively connected to said cathode to establish a negative electrical potential of said cathode and a positive terminal connected to said nozzle to establish a positive electrical potential of said nozzle, thereby initiating an electric arc between said cathode and said nozzle, a pilot plasma direct current power supply having a negative terminal operatively connected to said cathode and a positive terminal operatively connected to said nozzle to increase the energy state of said electric arc, thereby extending said electric arc through said restricted nozzle orifice and forming a constricted plasma arc, said power source then transferring said constricted plasma arc from said nozzle to said wire feedstock free end.

14. The plasma transferred wire arc bore coating apparatus defined in claim 11, wherein said apparatus includes a generally conical gas port surrounding said restricted nozzle orifice connected to a second gas source, said port directing a conical second gas stream surrounding said constricted plasma arc.

15. The plasma transferred wire arc bore coating apparatus defined in claim 11, wherein the angle defined between said longitudinal axis of said wire feedstock and said constricted plasma arc is less than 90°.

16. A plasma transferred wire arc thermal spray apparatus comprising a plasma generating torch assembly including a cathode having a negative electrical potential and a nozzle having a positive electrical potential generally surrounding a free end of said cathode in spaced relation having a restricted nozzle orifice opposite said cathode free end, a source of plasma gas directing plasma gas under pressure into said nozzle exiting said nozzle restricted orifice, and a wire feeder continuously directing a free end of a wire feedstock opposite said restricted nozzle orifice, said wire feedstock having a positive electrical potential generally equal to said nozzle, said apparatus establishing a constricted plasma arc between said cathode and said wire feedstock free end, and said wire feedstock having a longitudinal axis defining an angle of less than 90° relative to said restricted plasma arc, said constricted plasma arc melting said wire feedstock free end and said plasma gas atomizing molten feedstock and propelling atomized molten feedstock onto a work surface forming a dense metal coating on said surface.

17. The plasma transferred wire arc thermal spray apparatus defined in claim 16, wherein said wire feeder includes a generally tubular wire guide through which said wire feedstock is fed to said restricted nozzle orifice in electrical contact with said wire guide, and said wire guide in electrical contact with said nozzle maintaining said positive electrical potential of said nozzle.

18. A method of coating a surface with a dense metallic coating using a plasma transferred wire arc thermal spray apparatus, said apparatus including a cathode, a nozzle generally surrounding a free end of said cathode in spaced relation having a restricted orifice opposite said cathode free end and a wire feed directing a free end of a wire feedstock opposite said restricted nozzle orifice, said method comprising:

directing a plasma gas into said nozzle surrounding said cathode and exiting said restricted nozzle orifice;

initiating an electrical pilot arc between said cathode and said nozzle by creating an electrical potential differential therebetween, wherein said cathode has a negative electrical potential and said nozzle has a positive electrical potential;

extending said electric arc through said restricted nozzle orifice by increasing electrical energy to said electric arc and forming a constricted extended plasma arc; and transferring said constricted extended plasma arc from said nozzle to said free end of said wire feedstock by creating an electrical potential differential between said wire feedstock free end and said cathode, wherein said wire feedstock and said nozzle have the same positive electrical potential and said cathode has a negative electrical potential, thereby melting said wire feedstock free end, said plasma gas atomizing molten feedstock and propelling atomized molten feedstock onto said surface and forming said dense metal coating on said surface.

19. The method of coating a surface with a dense metallic coating as defined in claim 18, wherein said method includes rotating said nozzle and said cathode as an assembly about a longitudinal axis of said wire feedstock while maintaining an electrical connection and the same electrical potential between said nozzle and said wire feedstock, thereby directing said atomized molten feedstock rotationally and coating an internal arcuate surface with said dense metal coating.

20. The method of coating a surface with a dense metallic coating as defined in claim 18, wherein said method includes directing a plasma gas under pressure tangentially into said nozzle and creating a vortex flow around said cathode and exiting said restricted nozzle orifice.

21. The method of coating a surface with a dense metallic coating as defined in claim 18, wherein said method includes directing a second gas stream towards said wire feedstock free end in the form of an annular conical gas stream surrounding said wire feedstock free end and having a point of intersection spaced downstream of said wire feedstock free end.

22. A method of coating an interior concave surface with a dense metallic coating using a plasma transferred wire arc thermal spray apparatus, said apparatus comprising a plasma generating torch assembly, a wire feed and a source of plasma gas, said plasma generating torch assembly including a cathode having a negative electrical potential and a nozzle having a positive electrical potential generally surrounding a free end of said cathode in spaced relation having a restricted nozzle orifice opposite said cathode free end, said wire feedstock in electrical contact with said nozzle and having the same positive electrical potential as said nozzle, and said plasma generating torch assembly rotatably mounted to rotate about a longitudinal axis of said wire feedstock, said method comprising:

directing a plasma gas from said source of plasma gas into said nozzle surrounding said cathode and exiting said restricted nozzle orifice;

generating a constricted plasma-arc between said cathode and said wire feedstock free end thereby melting said wire free stock free end, said plasma gas exiting said restricted nozzle orifice atomizing molten feedstock and propelling atomized molten feedstock toward said concave surface; and rotating said plasma generating torch assembly about said longitudinal axis of said wire feedstock while maintaining said electrical contact between said wire feedstock and said nozzle, thereby propelling said atomized molten feedstock arcuately to coat said interior concave surface.

23. The method of coating an interior concave surface with a dense metallic coating as defined in claim 22, wherein said constricted plasma arc is generated by the following method steps:

initiating an electrical pilot arc between said cathode and said nozzle by creating an electrical potential differential therebetween, wherein said cathode has a negative electrical potential and said nozzle has a positive electrical potential;

extending said electrical pilot arc through said restricted nozzle opening by increasing the electrical energy of said electrical pilot arc, forming a constricted extended plasma arc; and transferring said constricted extended plasma arc from said nozzle to said free end of said wire feedstock by creating an electrical potential differential between said wire feedstock free end and said cathode by connecting a separate direct power source having a positive terminal operatively connected to said nozzle and a negative terminal connected to said cathode and wherein said wire feedstock is electrically connected to said nozzle creating the same positive electrical potential for said nozzle and said wire feedstock.

24. The method of coating an interior concave surface with a dense metallic coating as defined in claim 22, wherein said method includes directing a second gas stream towards said wire feedstock free end in the form of an annular conical gas stream surrounding said wire feedstock free end and having a point of intersection spaced downstream of said wire feedstock free end.

* * * * *